United States Patent [19]

Meier

[11] 4,449,714
[45] May 22, 1984

[54] TURBINE ENGINE SEAL AND METHOD FOR REPAIR THEREOF

[75] Inventor: John W. Meier, West Hartford, Conn.

[73] Assignee: Gulf & Western Industries, Inc., New York, N.Y.

[21] Appl. No.: 477,717

[22] Filed: Mar. 22, 1983

[51] Int. Cl.³ .................. F16J 15/44; F01D 11/08; B05D 1/08
[52] U.S. Cl. .......................... 277/9; 277/53; 277/235 A; 277/DIG. 6; 277/236; 427/34; 415/170 R; 29/402.07
[58] Field of Search ............... 277/1, 9, 53, DIG. 6, 277/235 R, 235 A, 236; 427/34; 29/156.8 R, 402.07; 415/170 R

[56] References Cited

U.S. PATENT DOCUMENTS

| | | | |
|---|---|---|---|
| 2,285,583 | 6/1942 | Jennings et al. | 277/1 X |
| 3,046,648 | 7/1962 | Kelly | 29/156.8 R X |
| 3,918,925 | 11/1975 | McComas | 277/235 A X |
| 4,060,250 | 11/1977 | Davis et al. | 415/170 R X |
| 4,148,494 | 4/1979 | Zelaby et al. | 277/53 |
| 4,291,448 | 8/1981 | Cretella et al. | 29/156.8 B |
| 4,336,276 | 6/1982 | Bill et al. | 427/34 |

FOREIGN PATENT DOCUMENTS 2001692A 7/1979 United Kingdom .

OTHER PUBLICATIONS

Elektrie, vol. 32, No. 4, 1978, E. Kranz et al., "Verfahren der Plasmatechnologie", pp. 194–199.

Primary Examiner—Robert S. Ward
Attorney, Agent, or Firm—A. Thomas Kammer

[57] ABSTRACT

A method for repairing turbine engine seals and a product manufactured in accordance with the method are provided. A worn or damaged honeycomb seal is removed from a backing plate together with a portion of the surface of the plate. The plate is restored to substantially its original thickness by a low pressure plasma spraying operation which may be followed by further machining to arrive at the required plate thickness. A new seal is then brazed thereon. The finished product will include the backing plate, a low pressure plasma sprayed coated surface, and a honeycomb seal brazed to the coated surface.

20 Claims, 7 Drawing Figures

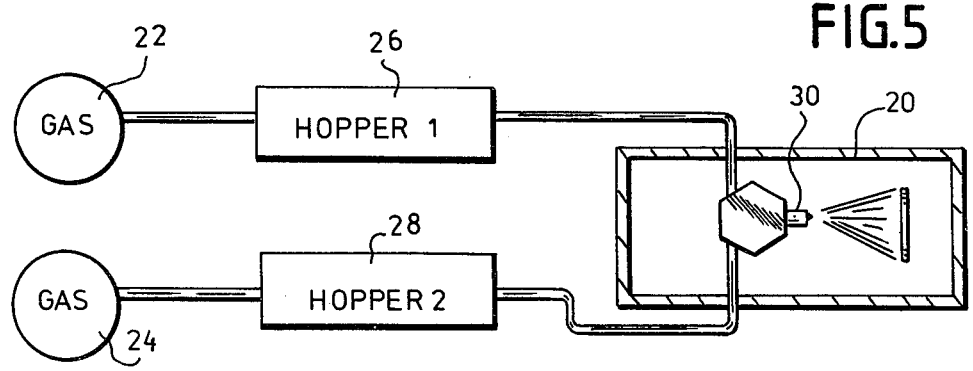
FIG.5
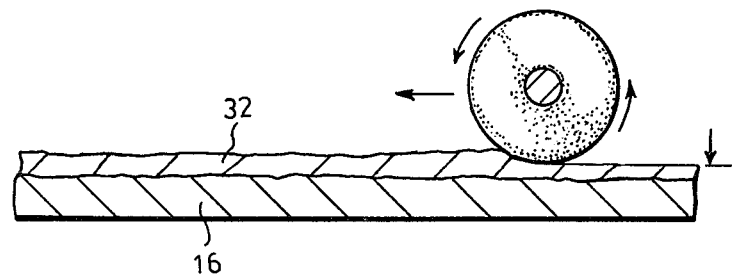
FIG.6
FIG.7
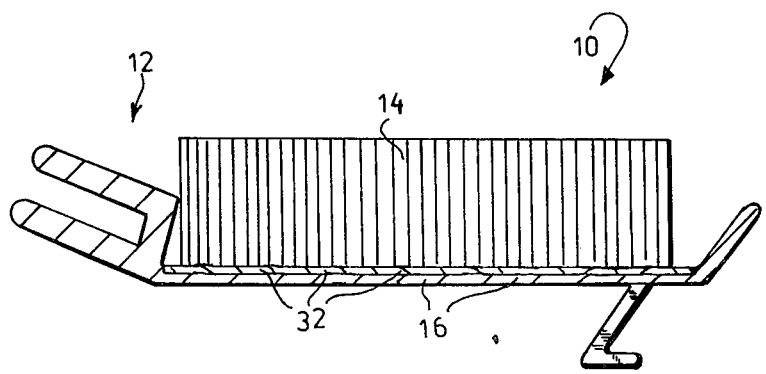

TURBINE ENGINE SEAL AND METHOD FOR REPAIR THEREOF

BACKGROUND OF THE INVENTION

1. Field of the Invention

The field of the invention relates to a seal for a turbine engine and a method for repair thereof which includes the spraying of a material thereon by employing a low pressure plasma spray method.

2. Brief Description of the Prior Art

Gas turbine engines include honeycomb seals which are mounted to a plurality of backing plates. When a seal is in need of replacement, it is removed from the backing plate which is then resurfaced. A new honeycomb seal is then brazed thereon.

Removal of the seal is often accomplished by means of a milling machine or a lathe. This step, in addition to any resurfacing which may be necessary, results in the removal of a portion of the wall which supports the seal. This backing wall is eventually reduced in thickness to such an extent that the part becomes unserviceable.

SUMMARY OF THE INVENTION

A primary object of the invention is to provide a method for repairing a turbine seal which does not reduce the thickness of the backing wall from which the seal is removed. If the method is employed for initial repairs and thereafter, it will prevent the backing wall from ever being reduced below minimum specifications. Another object of the invention is to salvage seals which have backing wall thickness under minimum specification.

The method according to the invention is basically a three-step process. The seal is removed from a wall of the backing plate, the wall is built up to an acceptable range up to a maximum specified thickness, and a new seal is applied. A low pressure plasma spray chamber is preferably employed for depositing a very dense and adherent layer to the appropriate surface of the backing plate. After the desired thickness has been applied, the seal may be brazed thereto. A repaired product is accordingly obtained having substantially the same dimensions and serviceability as when new.

BRIEF DESCRIPTION OF THE DRAWINGS

FIG. 5 schematically illustrates a system for the low pressure plasma spraying of a backing plate;

FIG. 6 illustrates the step of machining the coated backing plate to the desired dimensions; and FIG. 7 is a sectional elevational view illustrating a honeycomb seal brazed to the coated surface of the backing plate.

DETAILED DESCRIPTION OF THE INVENTION

Low pressure plasma spraying has been a relatively recent development which produces coatings of high density, improved bond strength and, with some sprayed materials, a coating with significant strength. The process is currently used for applying oxide free coatings with superior metallurgical bonds compared to conventional techniques. Suggested uses include coatings for gas turbine airfoils, thick film vacuum depositions for electronic applications, and as a replacement for conventional plating methods.

The invention makes use of plasma spraying a layer of material in a moderate vacuum (low pressure plasma spraying) in a unique manner as part of the process of repairing the seals of a gas turbine engine.

Figure 1:
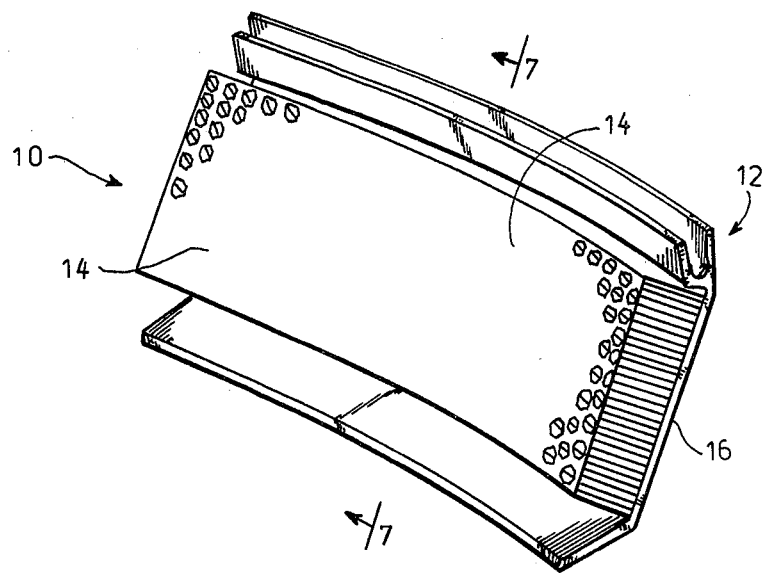
FIG. 1 is a perspective view of a high pressure seal segment of a gas turbine engine.
Figure 2:
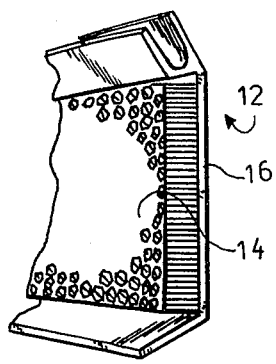
FIG. 2 is a perspective view of a portion of a seal segment having some damage thereto.

A new or repaired seal segment 10 of a gas turbine engine is illustrated in FIG. 1. It includes a backing plate 12 having a honeycomb seal 14 brazed thereon. The thickness of a backing wall 16 supporting the seal 14 is dimensioned to precise specification during the manufacturing process. If the seal becomes damaged as shown in FIG. 2 through abuse or normal wear, it must be replaced.

Figure 3:
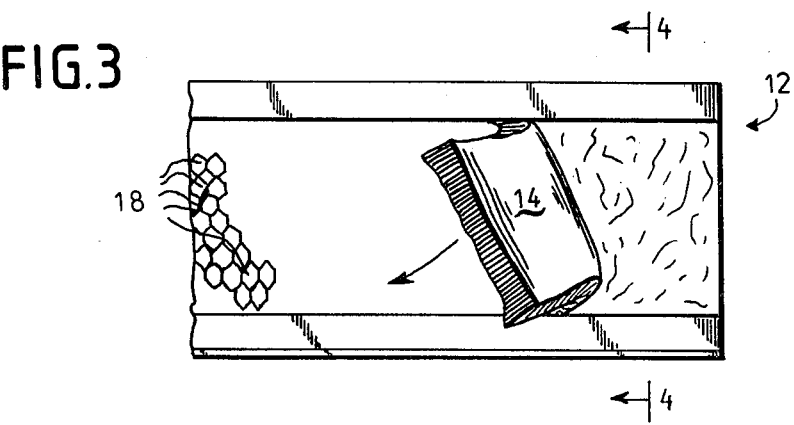
FIG. 3 illustrates the step of removing a damaged seal from a backing plate.

Removal of the seal is accomplished as shown in FIG. 3, usually by mechanical or chemical means. A number of hexagonal impressions 18, shown greatly enlarged in size, often remain on the surface of the backing wall 16 after this step. Because all of the honeycomb must be removed prior to the application of a new seal, a portion of the backing wall 16 is removed as well. In accordance with conventional repair methods, a new seal would be brazed to the plate 12 at this time. It will be appreciated that the backing wall 16 becomes too thin after one or more such repairs and the plate 12 must be discarded.

Figure 4:
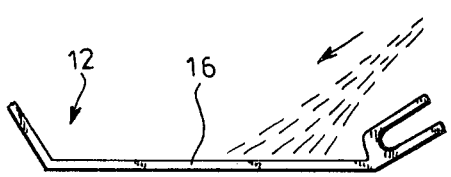
FIG. 4 illustrates the step of roughing the surface of the backing plate once the seal has been removed.

In accordance with the invention, the backing wall is restored to about its original maximum dimensions during the process of replacing the seal. After the backing wall surface is hand blended with a rotary belt machine and sanded, the backing plate is inspected and its dimensions checked. Since a plurality of such plates are generally processed at the same time, they are each dimensioned and segregated by thickness. The backing wall surface of each plate is grit blasted with a grit blasting machine as schematically illustrated in FIG. 4. The grit may be a 220 mesh aluminum oxide. This provides a good rough surface which enhances mechanical bonding. The surface is cleaned by ultrasonic means or in a degreasing solvent to remove any grit and contaminants which may be left thereon. As a cautionary measure, the plate may be redimensioned after this step. It is then ready for loading within a holding fixture (such as a carousel) within a plasma spraying chamber 20.

The system for low pressure plasma spraying the plate 12 is shown in FIG. 5. It includes a first gas source 22, a second gas source 24, a first hopper 26, a second hopper 28, the spraying chamber 20, a spray gun 30 within the chamber, and the holding fixture (not shown) upon which the backing plates 12 are mounted.

Once the plates are loaded upon the fixture, the process of evacuating the chamber begins. When the desired vacuum is obtained, the plasma gun 30 is started and the appropriate parameters set. The plates are preheated to a desired temperature, a process which may result in the formation of some surface oxides. Reverse transfer arc (RTA) is then introduced to complete the preheat cycle. After reaching the appropriate temperature, the flow of metallic powder from the hoppers to the gun begins. Using a torch having a plasma gas supported flame, the powder is melted and subjected to high speed acceleration. Immediate diffusion bonding to the backing wall surface thereby occurs.

Substantially perfect interfacial cleanliness is achieved through the use of reverse transferred arc cleaning. The principle of RTA is that the substrate becomes part of the electrical circuit. This circuit is superimposed over the existing plasma gun power circuit. When superimposed in the reversed mode the substrate becomes anodic and surface atoms release free electrons.

As the electron stream increases, reverse sputtering occurs, thus stripping the first layers of atoms (mostly oxides and other undesirable surface impurities). The net result is perfectly clean surfaces which cannot be attained by conventional means. In addition, cleanliness is maintained during processing because of low partial pressure maintained during spraying.

Plasma spraying under partial pressure yields an increase in plasma gas velocity. Typical velocities are in the mach 2.5 to mach 3 range. This increase in velocity when coupled with the correct powder particle size greatly improves densities achieved when compared to conventional spraying methods. In many cases, as-sprayed structures with densities of greater than 99% are realized with minimum densities of 97% for most materials.

Another important feature of low pressure plasma spraying is that the structures produced are clean and free of oxides and other impurities associated with conventional plasma spray methods. Reduced oxygen levels are achieved by evacuating the spray chamber to a pressure of less than 50 microns prior to spraying, then backfilling to the desired pressure (e.g., 40–50 torr) with argon during the spray cycle. Pressure is maintained by throttling the vacuum pumps during the cycle and the system is continuously flushed with clean inert gas.

HASTALLOY-X was selected as the metallic powder for this application for two reasons: (1) the material is compatible with most gas turbine materials with comparable thermal coefficients of expansion; (2) HASTALLOY-X is readily available in powder form and at a reasonable price. The composition of HASATALLOY-X is shown in the table below.

| COMPOSITION OF HASTALLOY-X (By Weight Percent) | |
|---|---|
| Ni - Balance | Mn - 1.0 |
| Cr - 22.0 | Si - 1.0 |
| Fe - 18.5 | W - 0.6 |
| Mo - 9.0 | C - 0.1 |
| Co - 1.5 | |

By way of example, the following parameters may be employed while applying a HASTALLOY-X coating to a substrate preheated to about 1650° F.:
Primary gas (argon) flow: 150 psi
Primary gas back pressure: 70 psi
First powder gas (argon) flow: 150 psi
First powder gas back pressure: about 22 psi
First powder (HASTALLOY-X) flow: about 5.8 lbs./hr.
Secondary gas (helium) flow: 275 psi
Secondary gas back pressure: 62 psi
Second powder gas (argon) flow: 150 psi
Second powder gas back pressure: about 20 psi
Second powder (HASTALLOY-X) flow: about 5.7 lb.s/hr.
Combined powder rate: about 11.5 lbs./hr.
Arc current (applied in gun): 1550 A
Arc voltage: 56 V
K.W.: 86.8
Positive Transferred Arc Current: 100 A
Negative Transferred Arc Current: 50 A
Vacuum Level During Spray: 30 TORR Depending upon the thickness of the coating to be applied, the spraying of a plurality of plates takes about ten to fifteen minutes. A coating thickness of 20–30 mil is typical, the actual thickness depending upon the thickness of the backing wall 16 and the coating necessary to restore it to near original specifications. Thicknesses up to about 35 mils are contemplated. It will be appreciated that the coating 32 shown in the drawings is out of proportion for purposes of illustration. The coating is applied as evenly as possible.

After the coating process is completed, the plate 12 is allowed to cool and the vacuum in the chamber 20 is broken. The plate 12 is removed from the chamber and dimensioned. The coated surface is machined to dimension as shown in FIG. 6. A braze tape or powder is then applied to the surface whereupon a new honeycomb seal 14 is resistance tack welded thereto to hold during brazing. The part is then brazed in a vacuum furnace. The finished product is shown in FIG. 7 (and FIG. 1).

While HASTALLOY-X, a nickel base super alloy, was employed in the process described above, it will be appreciated that a wide variety of materials could be employed both in the manufacture of the backing plate 12 and in the coating. Materials can be selected for mechanical, physical, and chemical properties including brazeability and heat treatment characteristics. The process parameters given by way of example above may vary depending upon the composition of the powder employed and the substrate to which it is applied.

It has been found that the restoration of substandard backing thickness using low pressure plasma spraying followed by installation of a honeycomb seal is an effective repair procedure. The brazeability of the honeycomb to the coated backing is comparable to the brazeability thereof in a conventional repair. The strength of the backing plate treated in accordance with the invention is also comparable to that of the original backing plate.

What is claimed is:

1. A method for repairing or constructing a seal assembly of the type having a backing plate and a seal attached thereto, comprising the steps of low pressure plasma spraying a surface of a backing wall of said backing plate to provide a coating thereon and increase the thickness of said backing wall, and attaching said seal to said coated surface.

2. A method as defined in claim 1 including the step of roughing said surface of said backing wall prior to the spraying thereof.

3. A method as defined in claim 2 including the step of removing a portion of said coating prior to applying said seal thereon.

4. A method as defined in claim 1 including the step of removing a portion of said coating prior to applying said seal thereon.

5. A method as defined in claim 1 including the step of brazing said seal to said coated surface.

6. A method as defined in claim 5 wherein said seal is a honeycomb seal.

7. A method as defined in claim 6 including the step of preheating said backing plate prior to the spraying thereof.

8. A method as defined in claim 7 including the step of reverse transferred arc cleaning said backing plate prior to plasma spraying.

9. A method as defined in claim 1 wherein said seal assembly is a high pressure turbine seal segment of a gas turbine engine.

10. A method as defined in claim 9 wherein said surface of said backing wall is sprayed with HASTALLOY-X.

11. A method as defined in claim 10 wherein said seal is a honeycomb seal, and including the step of brazing said seal to said coated surface.

12. A method for repairing a worn or damaged seal of a gas turbine engine, said seal including a backing plate having a backing wall and a honeycomb seal attached to said backing wall, comprising the steps of:
removing said honeycomb seal from said backing wall, thereby reducing the thickness of said backing wall;
low pressure plasma spraying the surface of said backing wall from which said honeycomb seal was removed, thereby restoring said backing wall to a desired thickness; and
applying a new honeycomb seal to said sprayed surface of said backing wall.

13. A method as defined in claim 12 including the step of roughing said surface prior to the spraying thereof.

14. A method as defined in claim 12 including removing a portion of said sprayed surface prior to applying said honeycomb seal.

15. A method as defined in claim 12 wherein said surface is sprayed with HASTALLOY-X.

16. A method as defined in claim 12 including the step of brazing said honeycomb seal to said surface.

17. A method as defined in claim 12 including the steps of:
roughing said surface after removing said honeycomb seal;
cleaning said surface after the roughing thereof;
loading said backing plate within a low pressure plasma spraying chamber;
evacuating said chamber;
preheating said backing plate;
reverse transferred arc cleaning said backing plate;
low pressure plasma spraying said backing plate within said chamber while heated until said desired thickness is obtained;
cooling said backing plate;
machining said sprayed surface to dimension; and
applying said new honeycomb seal to said sprayed and machined surface.

18. A seal for a turbine engine comprising a backing plate including a backing wall; a low pressure plasma sprayed coating upon said backing wall; and a honeycomb seal attached to said coating upon said backing wall.

19. A seal as defined in claim 18 wherein said coating is up to 35 mils in thickness.

20. A seal as defined in claim 18 wherein said coating is HASTALLOY-X.

* * * * *